US012609918B2

(12) United States Patent
Jaiswal et al.

(10) Patent No.: US 12,609,918 B2
(45) Date of Patent: Apr. 21, 2026

(54) SYSTEM AND METHOD FOR CLASSIFICATION OF NORMAL ENCRYPTED NETWORK TRAFFIC AND TRANSPORT LAYER SECURITY (TLS)-BASED VIRTUAL PRIVATE NETWORK TRAFFIC

(71) Applicant: Vehere Interactive Pvt Ltd, Kolkata (IN)

(72) Inventors: Naveen Jaiswal, Kolkata (IN); Debapriyay Mukhopadhyay, Kolkata (IN); Akash Mandal, Bankura (IN)

(73) Assignee: Vehere Technologies Private Limited, Kolkata (IN)

( * ) Notice: Subject to any disclaimer, the term of this patent is extended or adjusted under 35 U.S.C. 154(b) by 35 days.

(21) Appl. No.: 18/887,282

(22) Filed: Sep. 17, 2024

(65) Prior Publication Data

US 2025/0300977 A1 Sep. 25, 2025

(30) Foreign Application Priority Data

Mar. 22, 2024 (IN) .............................. 202431022172

(51) Int. Cl.
| | |
|---|---|
| *H04L 29/06* | (2006.01) |
| *H04L 9/40* | (2022.01) |
| *H04L 41/0681* | (2022.01) |
| *H04L 41/16* | (2022.01) |
| *H04L 43/0852* | (2022.01) |

(52) U.S. Cl.
CPC ...... *H04L 63/0485* (2013.01); *H04L 41/0681* (2013.01); *H04L 41/16* (2013.01); *H04L 43/0858* (2013.01); *H04L 63/166* (2013.01)

(58) Field of Classification Search
CPC .............. H04L 63/0485; H04L 63/166; H04L 41/0681; H04L 41/16; H04L 43/0858
See application file for complete search history.

(56) References Cited

U.S. PATENT DOCUMENTS

2007/0274227 A1 * 11/2007 Rauscher ................ H04L 43/50
                                                         370/252
2018/0123910 A1 * 5/2018 Fitzgibbon .............. H04L 43/08

* cited by examiner

*Primary Examiner* — Evans Desrosiers
(74) *Attorney, Agent, or Firm* — Kolisch Hartwell, P.C.

(57) ABSTRACT

A system for classifying network traffic retrieves first packet data from a network session between a client device and server. The first packet data includes a first set of Internet Protocol (IP) packets and timestamps, and calculates a first latency between: (i) a first timestamp of a first IP packet for initiating an encrypted connection, and (ii) a second timestamp of a second IP packet for acknowledging receipt of an IP packet. The system calculates a second latency between the first timestamp and a third timestamp of a third IP packet for establishing a connection. The system calculates a third latency between a third timestamp and a fourth timestamp of a fourth IP packet for accessing application data. The system also provides as input to machine learning model, the first, second, and third latencies, and generates and transmits an alert based upon an output of the machine learning model.

20 Claims, 5 Drawing Sheets

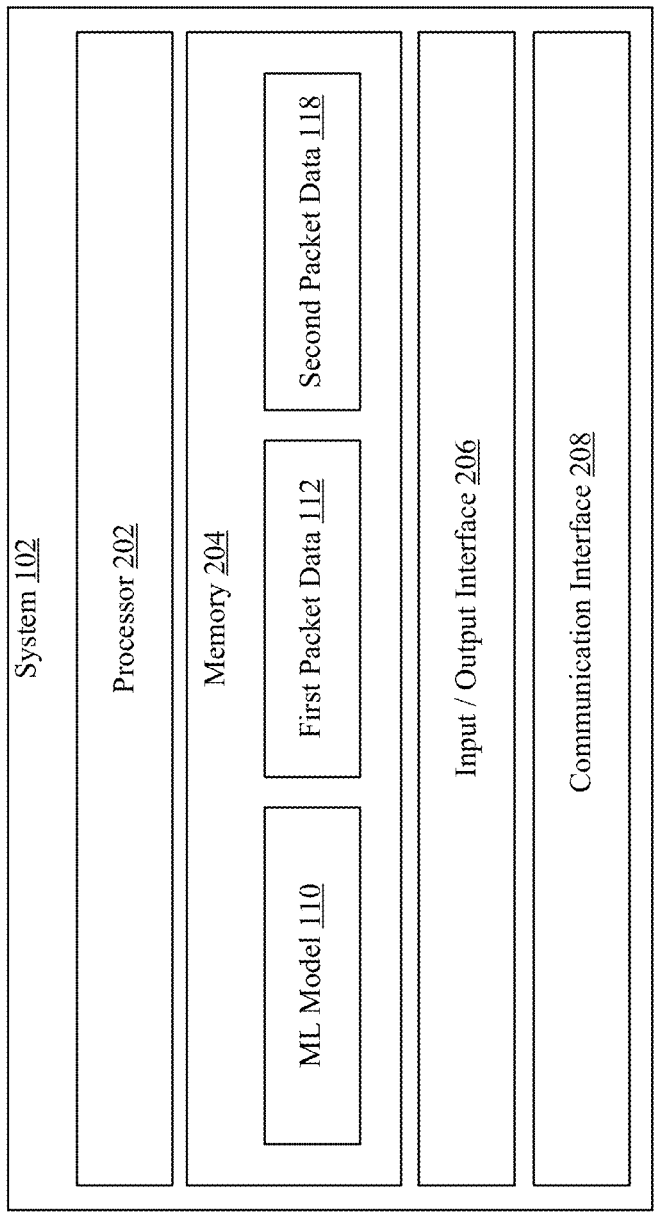
FIG. 2

Figure 3:
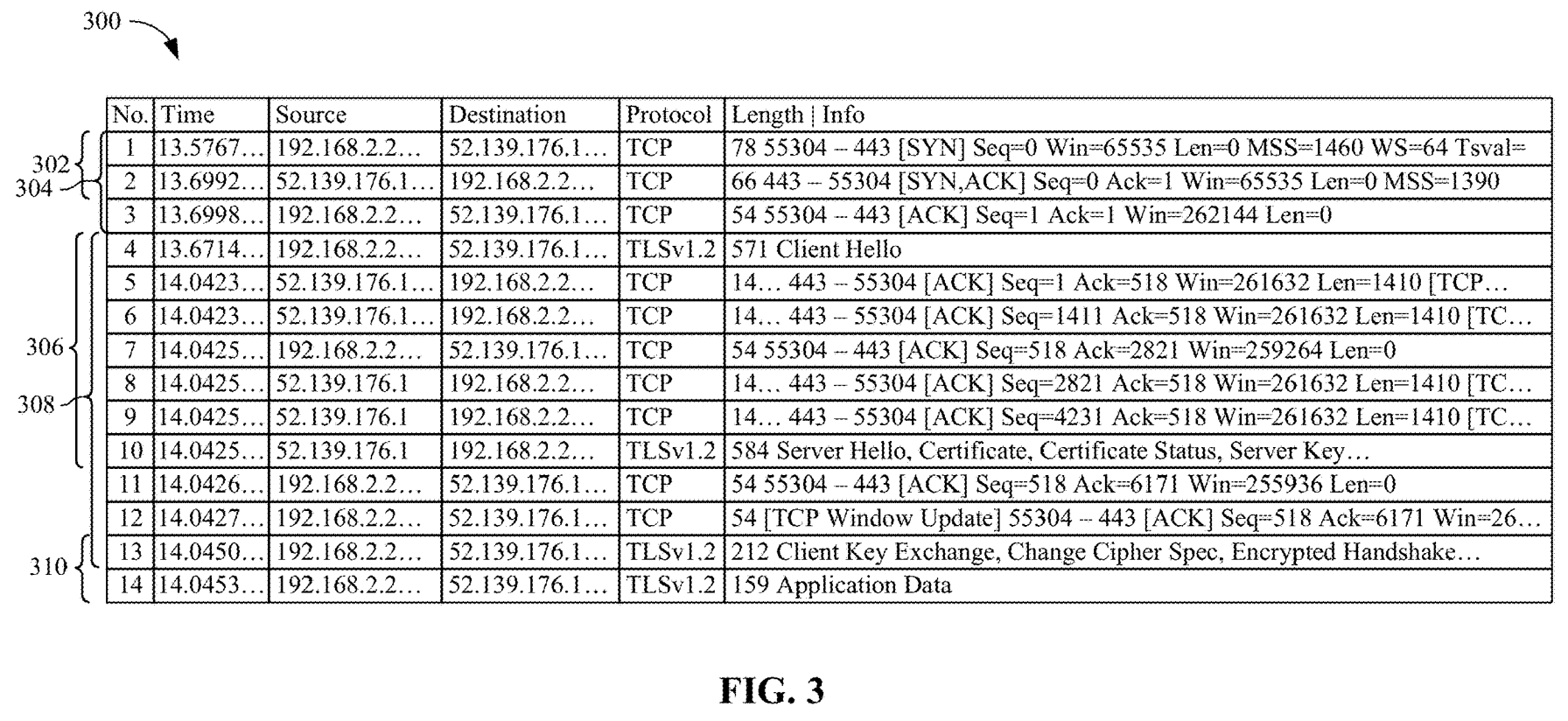

| No. | Time | Source | Destination | Protocol | Length | Info |
|-----|------|--------|-------------|----------|-------------|
| 1 | 13.5767... | 192.168.2.2... | 52.139.176.1... | TCP | 78 55304 → 443 [SYN] Seq=0 Win=65535 Len=0 MSS=1460 WS=64 Tsval= |
| 2 | 13.6992... | 52.139.176.1... | 192.168.2.2... | TCP | 66 443 → 55304 [SYN,ACK] Seq=0 Ack=1 Win=65535 Len=0 MSS=1390 |
| 3 | 13.6998... | 192.168.2.2... | 52.139.176.1... | TCP | 54 55304 → 443 [ACK] Seq=1 Ack=1 Win=262144 Len=0 |
| 4 | 13.6714... | 192.168.2.2... | 52.139.176.1... | TLSv1.2 | 571 Client Hello |
| 5 | 14.0423... | 52.139.176.1... | 192.168.2.2... | TCP | 14... 443 → 55304 [ACK] Seq=1 Ack=518 Win=261632 Len=1410 [TCP... |
| 6 | 14.0423... | 52.139.176.1... | 192.168.2.2... | TCP | 14... 443 → 55304 [ACK] Seq=1411 Ack=518 Win=261632 Len=1410 [TC... |
| 7 | 14.0425... | 192.168.2.2... | 52.139.176.1... | TCP | 54 55304 → 443 [ACK] Seq=518 Ack=2821 Win=259264 Len=0 |
| 8 | 14.0425... | 52.139.176.1 | 192.168.2.2... | TCP | 14... 443 → 55304 [ACK] Seq=2821 Ack=518 Win=261632 Len=1410 [TC... |
| 9 | 14.0425... | 52.139.176.1 | 192.168.2.2... | TCP | 14... 443 → 55304 [ACK] Seq=4231 Ack=518 Win=261632 Len=1410 [TC... |
| 10 | 14.0425... | 52.139.176.1 | 192.168.2.2... | TLSv1.2 | 584 Server Hello, Certificate, Certificate Status, Server Key... |
| 11 | 14.0426... | 192.168.2.2... | 52.139.176.1... | TCP | 54 55304 → 443 [ACK] Seq=518 Ack=6171 Win=255936 Len=0 |
| 12 | 14.0427... | 192.168.2.2... | 52.139.176.1... | TCP | 54 [TCP Window Update] 55304 → 443 [ACK] Seq=518 Ack=6171 Win=26... |
| 13 | 14.0450... | 192.168.2.2... | 52.139.176.1... | TLSv1.2 | 212 Client Key Exchange, Change Cipher Spec, Encrypted Handshake... |
| 14 | 14.0453... | 192.168.2.2... | 52.139.176.1... | TLSv1.2 | 159 Application Data |

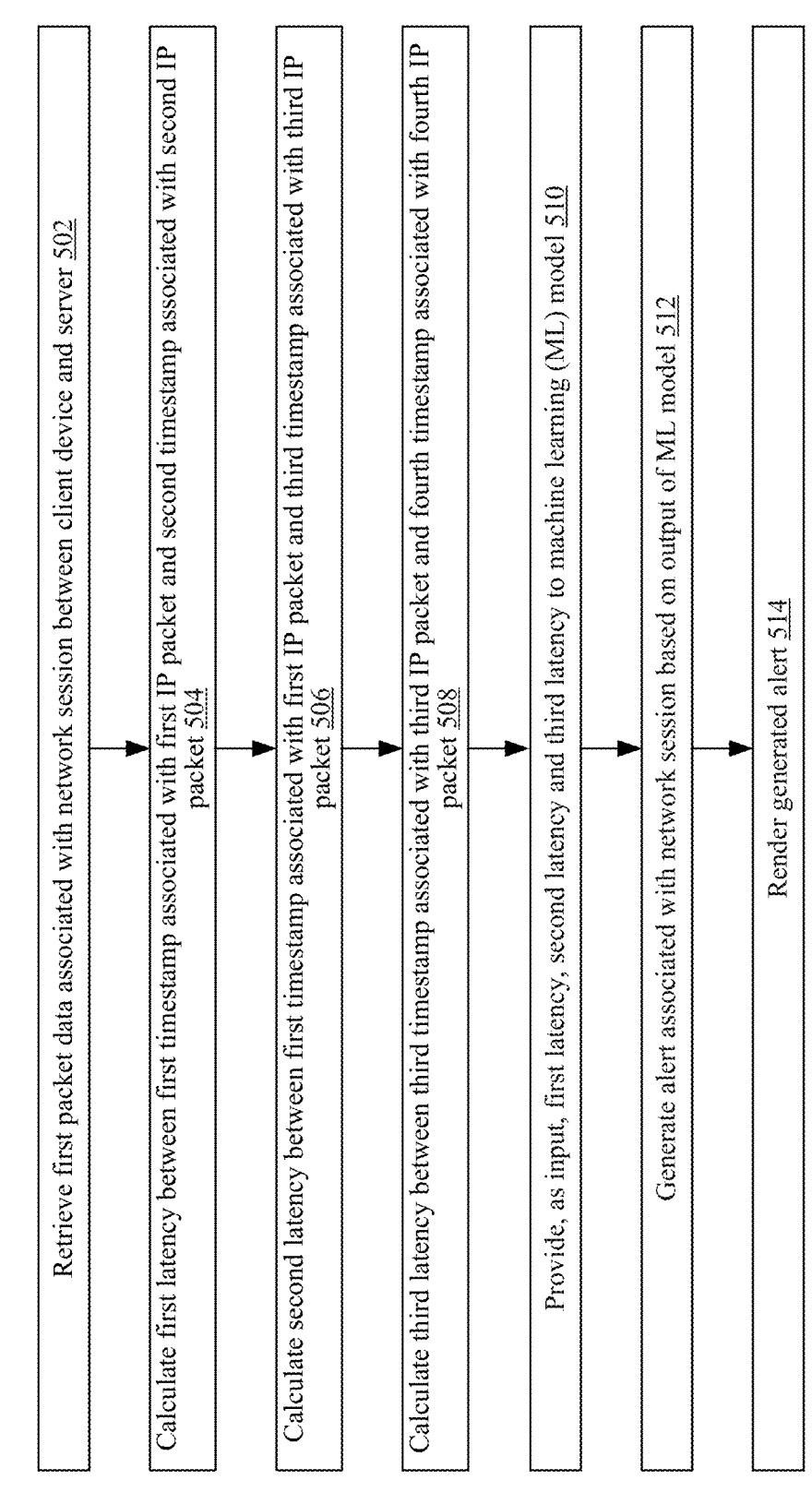

500

Retrieve first packet data associated with network session between client device and server 502

Calculate first latency between first timestamp associated with first IP packet and second timestamp associated with second IP packet 504

Calculate second latency between first timestamp associated with first IP packet and third timestamp associated with third IP packet 506

Calculate third latency between third timestamp associated with third IP packet and fourth timestamp associated with fourth IP packet 508

Provide, as input, first latency, second latency and third latency to machine learning (ML) model 510

Generate alert associated with network session based on output of ML model 512

Render generated alert 514

FIG. 5

SYSTEM AND METHOD FOR CLASSIFICATION OF NORMAL ENCRYPTED NETWORK TRAFFIC AND TRANSPORT LAYER SECURITY (TLS)-BASED VIRTUAL PRIVATE NETWORK TRAFFIC

TECHNOLOGICAL FIELD

The disclosure relates to the classification of network traffic and more specifically to a system and a method for classification of normal encrypted network traffic and Transport Layer Security (TLS)-based virtual private network (VPN) traffic.

BACKGROUND

In today's digital era, encryption of internet traffic is crucial for cybersecurity. Encryption is a process of encoding sensitive data to prevent unauthorized access, thereby ensuring confidentiality and integrity of the sensitive data during online communications. Further, Virtual Private Networks (VPNs) are designed to establish secure connections for remote access, thereby providing privacy and anonymity by encrypting the internet traffic and routing it through remote servers. While the encryption protects the sensitive data and provides online privacy, it may also pose challenges for cybersecurity professionals. For example, cyber criminals may leverage encryption and VPNs to conceal their activities and bypass security measures.

Therefore, there is a need to distinguish between encrypted network traffic and VPN-based network traffic to effectively mitigate emerging threats.

SUMMARY

A system and method are provided herein that focuses on the classification of normal encrypted network traffic and Transport Layer Security (TLS)-based virtual private network (VPN) traffic using machine learning.

In one aspect, a system for the classification of normal encrypted network traffic and Transport Layer Security (TLS)-based VPN traffic is provided. The system may include a processor. The processor may be configured to retrieve first packet data associated with a network session between a client device and a server. The first packet data includes a first set of Internet Protocol (IP) packets and a timestamp associated with each IP packet of the first set of IP packets. The processor may be further configured to calculate, based on the retrieved first packet data, a first latency between a first timestamp associated with a first IP packet transmitted from the client device to the server to initiate an encrypted connection with the server and a second timestamp associated with a second IP packet transmitted from the server to the client device to acknowledge reception of the first IP packet by the server. The first set of IP packets includes the first IP packet and the second IP packet. The processor may be further configured to calculate, based on the retrieved first packet data, a second latency between the first timestamp associated with the first IP packet and a third timestamp associated with a third IP packet transmitted from the client device to the server for an establishment of the encrypted connection between the client device and the server. The first set of IP packets includes the third IP packet. The processor may be further configured to calculate, based on the retrieved first packet data, a third latency between the third timestamp associated with the third IP packet and a fourth timestamp associated with a fourth IP packet transmitted from the client device to the server to access application data from the server. The first set of IP packets includes the fourth IP packet. The processor may be further configured to provide, as an input, the calculated first latency, the calculated second latency, and the calculated third latency to a machine learning (ML) model. The processor may be further configured to generate an alert associated with the network session based on an output of the ML model and render the generated alert.

In additional system embodiments, the processor may be further configured to retrieve second packet data associated with the network session between the client device and the server. The second packet data includes a second set of Internet Protocol (IP) packets and a timestamp associated with each IP packet of the second set of IP packets. Further, the processor may be configured to calculate, based on the retrieved second packet data, a fourth latency between a first timestamp associated with a first IP packet transmitted from the client device to the server to initiate a Transmission Control Protocol (TCP)-based network connection between the client device and the server and a second timestamp associated with a second IP packet transmitted from the server to the client device to acknowledge reception of the first IP packet by the server. The second set of IP packets includes the first IP packet and the second IP packet. Thereafter, the processor may be further configured to provide, as the input, the calculated fourth latency to the ML model, and generate the alert associated with the network session based on the output of the ML model.

In additional system embodiments, the processor may be further configured to calculate, based on the retrieved second packet data, a fifth latency between the first timestamp associated with the first IP packet and a third timestamp associated with a third IP packet transmitted from the client device to the server for an establishment of a TCP-based network connection between the client device and the server. The second set of IP packets includes the third IP packet. Thereafter, the processor may be further configured to provide, as the input, the calculated fifth latency to the ML model, and generate the alert associated with the network session based on the output of the ML model.

In additional system embodiments, the second set of Internet Protocol (IP) packets may be associated with the establishment of the TCP-based network connection between the client device and the server.

In additional system embodiments, the first set of Internet Protocol (IP) packets may be associated with an encryption of the network session between the client device and the server.

In additional system embodiments, the processor may be further configured to classify the network session between the client device and the server as one of an encrypted network session (or normal encrypted network traffic) or a virtual private network (VPN)-based encrypted network session (or TLS-based VPN traffic) based on the output of the ML model, and generate the alert based on the classification of the network session.

In additional system embodiments, the ML model may be pre-trained to classify the network session between the client device and the server as one of an encrypted network session (or normal encrypted network traffic) or a virtual private network (VPN)-based encrypted network session (or TLS-based VPN traffic) based on the retrieved first packet data associated with the network session.

In additional system embodiments, the processor may be further configured to train the ML model based on the calculated first latency, the calculated second latency, the calculated third latency, a fourth latency, a fifth latency, and the generated alert, and store the trained ML model.

In additional system embodiments, the ML model may correspond to an Extreme Gradient Boosting (XGBoost) based classifier.

In additional system embodiments, the ML model corresponds to an Artificial Neural Network (ANN) based classifier.

In another aspect, a method for classification of normal encrypted network traffic and Transport Layer Security (TLS)-based virtual private network (VPN) traffic is provided. The method may include retrieving first packet data associated with a network session between a client device and a server. The first packet data includes a first set of Internet Protocol (IP) packets and a timestamp associated with each IP packet of the first set of IP packets. The method may further include calculating, based on the retrieved first packet data, a first latency between a first timestamp associated with a first IP packet transmitted from the client device to the server to initiate an encrypted connection with the server and a second timestamp associated with a second IP packet transmitted from the server to the client device to acknowledge reception of the first IP packet by the server. The first set of IP packets includes the first IP packet and the second IP packet. The method may further include calculating, based on the retrieved first packet data, a second latency between the first timestamp associated with the first IP packet and a third timestamp associated with a third IP packet transmitted from the client device to the server for an establishment of the encrypted connection between the client device with the server. The first set of IP packets includes the third IP packet. The method may further include calculating, based on the retrieved first packet data, a third latency between the third timestamp associated with the third IP packet and a fourth timestamp associated with a fourth IP packet transmitted from the client device to the server to access the application data from the server. The first set of IP packets includes the fourth IP packet. The method may further include providing, as an input, the calculated first latency, the calculated second latency, and the calculated third latency to a machine learning (ML) model. The method may further include generating an alert associated with the network session based on an output of the ML model and rendering the generated alert.

In additional method embodiments, the method may further include retrieving second packet data associated with the network session between the client device and the server. The second packet data includes a second set of Internet Protocol (IP) packets and a timestamp associated with each IP packet of the second set of IP packets. Further, the method may include calculating, based on the retrieved second packet data, a fourth latency between a first timestamp associated with a first IP packet transmitted from the client device to the server to initiate a Transmission Control Protocol (TCP)-based network connection between the client device and the server and a second timestamp associated with a second IP packet transmitted from the server to the client device to acknowledge reception of the first IP packet by the server. The second set of IP packets includes the first IP packet and the second IP packet. Thereafter, the method may further include providing, as the input, the calculated fourth latency to the ML model, and generating the alert associated with the network session based on the output of the ML model.

In additional method embodiments, the method may further include calculating, based on the retrieved second packet data, a fifth latency between the first timestamp associated with the first IP packet and a third timestamp associated with a third IP packet transmitted from the client device to the server for an establishment of a TCP-based network connection between the client device and the server. The second set of IP packets includes the third IP packet. Thereafter, the method may further include providing, as the input, the calculated fifth latency to the ML model, and generating the alert associated with the network session based on the output of the ML model.

In additional method embodiments, the second set of Internet Protocol (IP) packets may be associated with the establishment of the TCP-based network connection between the client device and the server.

In additional method embodiments, the first set of Internet Protocol (IP) packets may be associated with an encryption of the network session between the client device and the server.

In additional method embodiments, the method may further include classifying the network session between the client device and the server as one of an encrypted network session (or normal encrypted network traffic) or a virtual private network (VPN)-based encrypted network session (or TLS-based VPN traffic) based on the output of the ML model, and generating the alert based on the classification of the network session.

In additional method embodiments, the ML model may be pre-trained to classify the network session between the client device and the server as one of an encrypted network session (or normal encrypted network traffic) or a virtual private network (VPN)-based encrypted network session (or TLS-based VPN traffic) based on the retrieved first packet data associated with the network session.

In additional method embodiments, the method may further include training the ML model based on the calculated first latency, the calculated second latency, the calculated third latency, a fourth latency, a fifth latency, and the generated alert, and storing the trained ML model.

In additional method embodiments, the ML model may correspond to one of an Extreme Gradient Boosting (XGBoost) based classifier, or an Artificial Neural Network (ANN) based classifier.

In yet another aspect, a non-transitory computer-readable storage medium carrying one or more sequences of one or more instructions which, when executed by at least one processor, cause a system to perform operations comprising retrieving first packet data associated with a network session between a client device and a server. The first packet data includes a first set of Internet Protocol (IP) packets and a timestamp associated with each IP packet of the first set of IP packets. The operations may further include calculating, based on the retrieved first packet data, a first latency between a first timestamp associated with a first IP packet transmitted from the client device to the server to initiate an encrypted connection with the server and a second timestamp associated with a second IP packet transmitted from the server to the client device to acknowledge reception of the first IP packet by the server. The first set of IP packets includes the first IP packet and the second IP packet. The operations may further include calculating, based on the retrieved first packet data, a second latency between the first timestamp associated with the first IP packet and a third timestamp associated with a third IP packet transmitted from the client device to the server for an establishment of the encrypted connection between the client device with the server. The first set of IP packets includes the third IP packet. The operations may further include calculating, based on the retrieved first packet data, a third latency between the third timestamp associated with the third IP packet and a fourth timestamp associated with a fourth IP packet transmitted from the client device to the server to access the application data from the server. The first set of IP packets includes the fourth IP packet. The operations may further include providing, as an input, the calculated first latency, the calculated second latency, and the calculated third latency to a machine learning (ML) model. The operation may further include generating an alert associated with the network session based on an output of the ML model and rendering the generated alert.

BRIEF DESCRIPTION OF THE DRAWINGS

Figure 1:
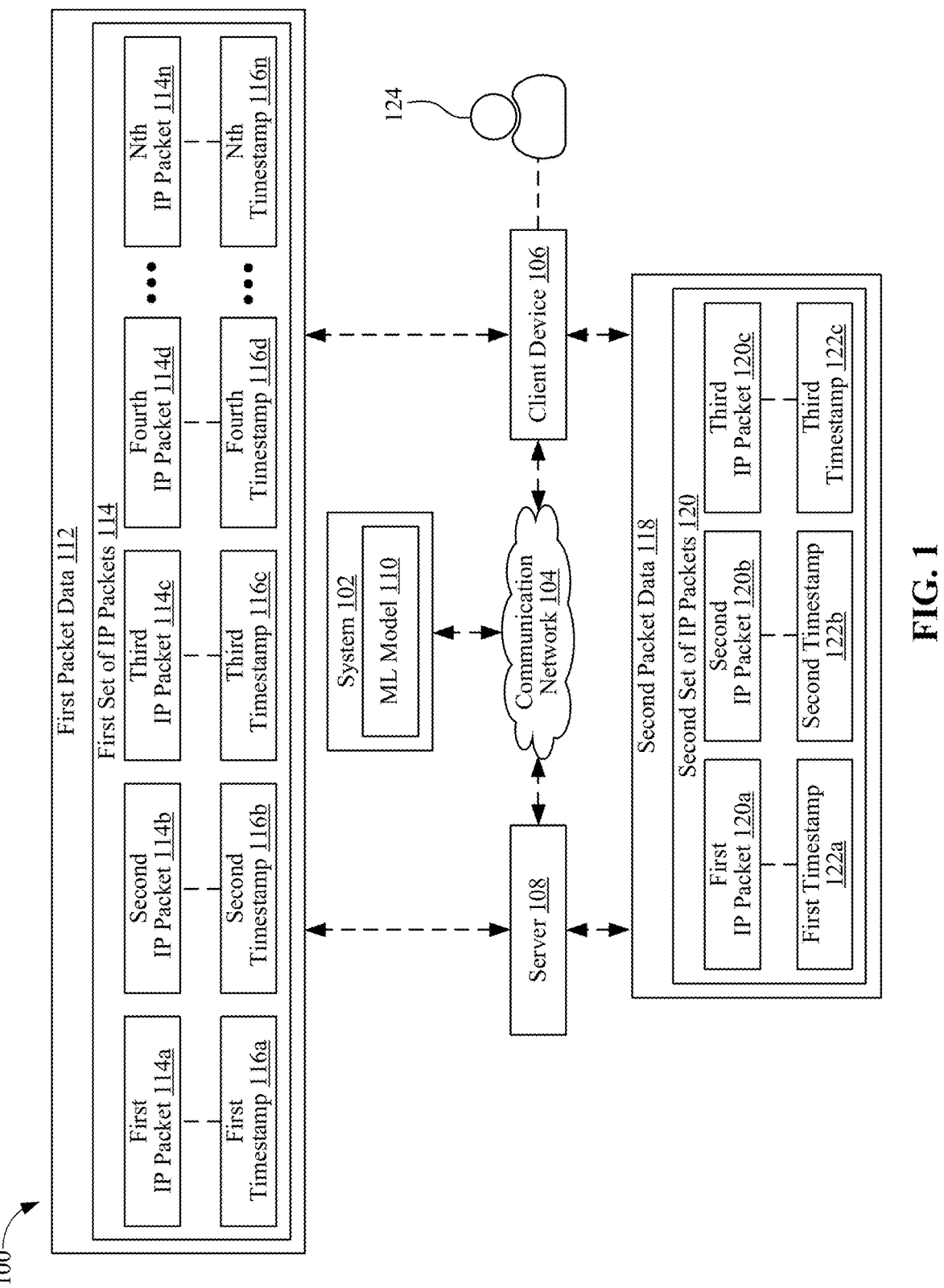
Figure 4:
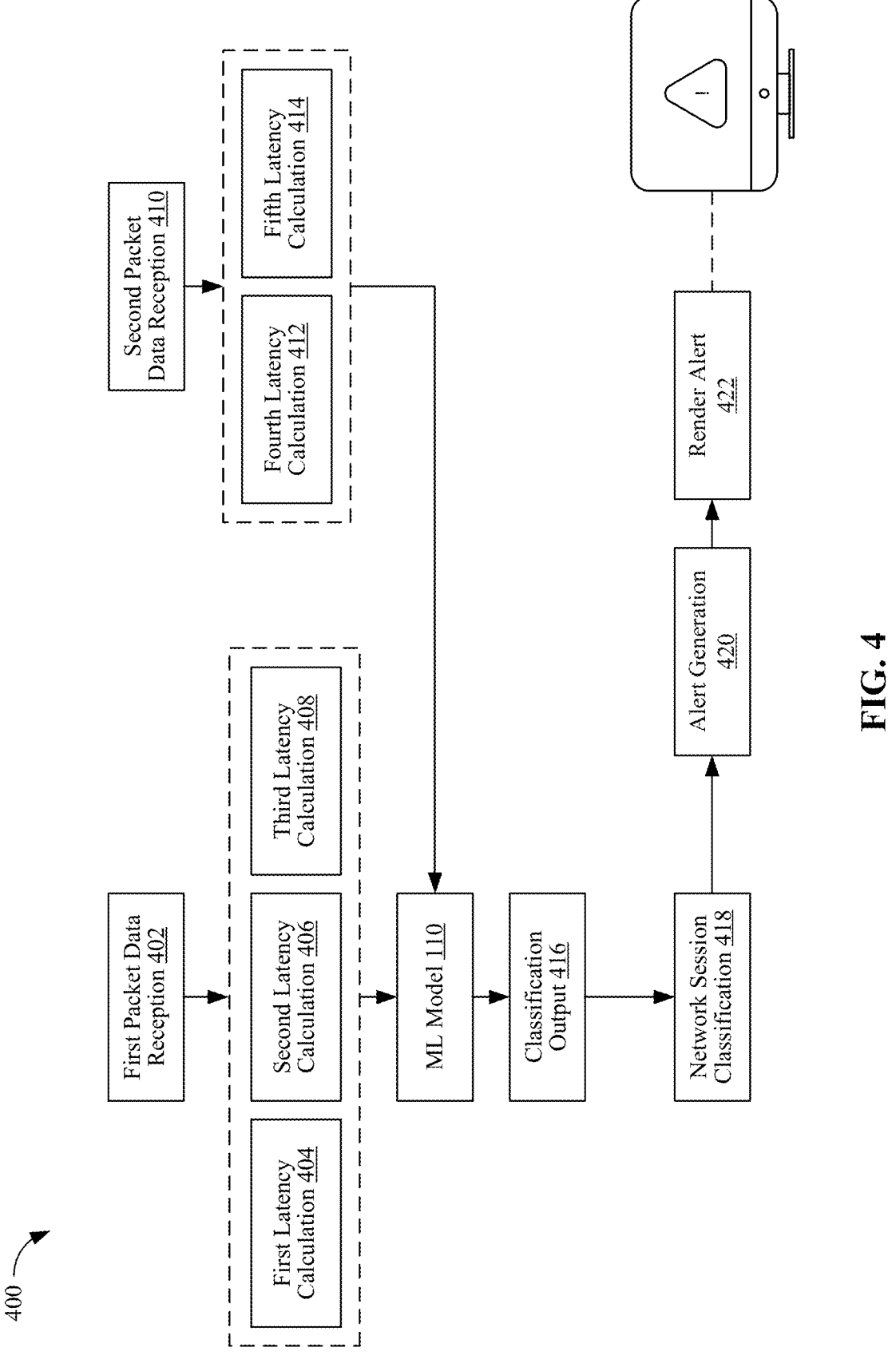

Having thus described example embodiments of the invention in general terms, reference will now be made to the accompanying drawings, which are not necessarily drawn to scale, and wherein:

FIG. 1 is a diagram that illustrates a network environment within which a system for classifying network sessions is implemented, in accordance with an embodiment of the disclosure;

FIG. 2 illustrates a block diagram of the system of FIG. 1, in accordance with an embodiment of the disclosure;

FIG. 3 is a diagram that illustrates exemplary packet data associated with the network session, in accordance with an embodiment of the disclosure;

FIG. 4 is a diagram that illustrates exemplary operations for classifying the network sessions, in accordance with an embodiment of the disclosure; and FIG. 5 is a flowchart that illustrates an exemplary method for classifying the network sessions, in accordance with an embodiment of the disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect. Turning now to FIG. 1-FIG. 5, a brief description concerning the various components of the present disclosure will now be briefly discussed. Reference will be made to the figures showing various embodiments of a system for classifying network sessions.

FIG. 1 is a diagram that illustrates a network environment within which a system for classifying network sessions is implemented, in accordance with an embodiment of the disclosure. The network environment 100 may include a system 102, a communication network 104, a client device 106, a server 108, first packet data 112 associated with a network session between the client device 106 and the server 108, and second packet data 118 associated with the network session between the client device 106 and the server 108. There is further shown a user 124 who may be associated with the client device 106.

The system 102 may be a highly specialized system that may integrate a hardware and a software to enhance network visibility and forensic capabilities. The system 102 may be equipped with a high-speed network interface, a multi-core processor, and a memory, the hardware configuration may support real-time packet processing and analysis. The custom software may orchestrate the communication network 104 monitoring process. The system 102 may further excel at session identification. The system 102 may be optimized for capturing packets from high-speed networks. For example, but not limited to, a 10 Giga bytes per second (GBPS) network. The system 102 may manage the network sessions and leverage the machine learning techniques for efficient classification of the network session as at least one of an encrypted network session (or normal encrypted network traffic) or a virtual private network (VPN)-based encrypted network session (or TLS-based VPN traffic). The system 102 may further provide data analysis, real-time monitoring, and security enhancement capabilities.

The system 102 may further include a machine learning (ML) model 110. The ML model 110 may correspond to a neural network-based classifier. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons). Outputs of all nodes in the input layer may be coupled to at least one node of the hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result.

The number of layers and the number of nodes in each layer may be determined from hyper-parameters of the neural network. Such hyper-parameters may be set before or while training the neural network on a training dataset. Each node of the neural network may correspond to a mathematical function (e.g., a sigmoid function or a rectified linear unit) with a set of parameters, tunable during training of the neural network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function.

In the training of the neural network, one or more parameters of each node of the neural network may be updated based on whether an output of the final layer for a given input (from a training dataset) matches a correct result based on a loss function for the neural network. The above process may be repeated for the same or a different input until a minimum loss function may be achieved, and a training error may be minimized. Several methods for training are known in the art, for example, gradient descent, stochastic gradient descent, batch gradient descent, gradient boost, meta-heuristics, and the like.

The neural network may include electronic data, such as, for example, a software program, code of the software program, libraries, applications, scripts, or other logic or instructions for execution by a processing device, such as circuitry. The neural network may be implemented using hardware including a processor, a microprocessor (e.g., to perform or control the performance of one or more operations), a field-programmable gate array (FPGA), or an application-specific integrated circuit (ASIC). Alternatively, in some embodiments, the neural network may be implemented using a combination of hardware and software. Although in FIG. 1, the ML model 110 is shown integrated within the system 102, the disclosure is not so limited. Accordingly, in some embodiments, the ML model 110 may be a separate entity in the system 102, without deviation from the scope of the disclosure. Examples of the ML model 110 may include, but are not limited to, an artificial neural network (ANN) based classifier, an Extreme Gradient Boosting (XGBoost) based classifier, a deep neural network (DNN) based classifier, a convolutional neural network (CNN) based classifier, Support Vector machine (SVM) based classifier, K-mean clustering based classifier, a fully connected neural network, and/or a combination of such networks. Details about the ML model 110 are provided, for example, in FIG. 4.

The network environment 100 may further include the client device 106. The client device 106 may be a specialized machine that may be designed for a specific task within the network environment 100. The client device 106 may play a crucial role in receiving requests from the user 124, processing data, and delivering the data efficiently. The client device 106 may be designed for high-performance computing and data handling, ensuring that the user 124 requests may be handled accordingly and that the requested content is delivered to the user 124 seamlessly. For example, the client device 106 may include but is not limited to, a computer, a laptop, a smartphone, or a tablet.

Further, the client device 106 may correspond to any computing device that may be configured to access services or information provided by the server 108. In an embodiment, the server 108 may be a specialized machine that may be designed for a specific task within the network environment 100. The server 108 may play a crucial role in responding to the request from the user 124 via the client device 106, processing data, and delivering the data efficiently. The server 108 may be designed for high-performance computing and data handling, ensuring that the user 124 requests may be handled accordingly and that the requested content is delivered to the user 124 seamlessly. Load balancing and redundancy further enhance the reliability, and the one or more servers in various locations worldwide optimize content delivery for the user 124 anywhere around the globe. For example, the server 108 may include but is not limited to, a mail server, a data server, an application server, or a database server.

In an embodiment, the user 124 may be a person from a corporation's dedicated information technology (IT) and a network management team, a telecommunications service provider management team, and the like. The user 124 may be associated with the system 102 to monitor network traffic, troubleshoot issues, and ensure optimal network performance across diverse regions. The user 124 may be equipped with the hardware and software of the system 102 to efficiently classify the network session as at least one of the encrypted network session (or normal encrypted network traffic) or a virtual private network (VPN)-based encrypted network session (or TLS-based VPN traffic). The user 124 reliance on the system 102 may be critical in maintaining network integrity and uninterrupted business operations on a global scale.

In an embodiment, the system 102 may be communicatively coupled to the client device 106, the server 108, or any other device, via the communication network 104. The communication network 104 may correspond to a sophisticated and a versatile infrastructure designed to facilitate seamless data transmission, management, and retrieval. Further, the communication network 104 may play an important role in supporting a diverse range of communication types, including web browsing, email exchanges, real-time voice and video calls, and large-scale data transfers. The communication network 104 may be wired, wireless, or any combination of wired and wireless communication networks, such as cellular, Wi-Fi, internet, local area networks, or the like. In some embodiments, the communication network 104 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for example LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

Further, the architectural design of the communication network 104 may incorporate various key elements and components, starting with a hierarchical network topology that may include core, distribution, and access layers to insure scalability, redundancy, and efficient data routing. Gateways and routers may be strategically positioned to connect local networks to the broader internet, efficiently managing the flow of data packets and ensuring proper routing. The communication network 104 may adhere to established network protocols, including Transmission Control Protocol/Internet Protocol (TCP/IP), User Datagram Protocol (UDP), Hypertext Transfer Protocol (HTTP), Hypertext Transfer Protocol Secure (HTTPS), and Session Initiation Protocol (SIP), ensuring data consistency, reliability, and secure communication. Security may be a top priority, encompassing firewalls, intrusion detection and prevention systems, and encrypted protocols to safeguard data and network integrity. Load balancers may distribute incoming network traffic across multiple servers, enhancing network reliability and optimizing resource usage.

The communication network 104 administrators (such as the user 124) may employ one or more monitoring and analysis tools to track performance, identify bottlenecks, and respond promptly to network issues. The communication network 104 scalability allows for the addition of devices, resources, and users without compromising performance or reliability. The user 124 associated with the system 102 may monitor, configure, and maintain the entire communication network 104, ensuring an optimal operation. In summary, the communication network 104 may provide a robust infrastructure required for the network environment 100 to excel, supporting efficient data communication, management, and retrieval across various communication channels.

All the components in the network environment 100 may be coupled directly or indirectly to the communication network 104. The components described in the network environment 100 may be further broken down into more than one component and/or combined in any suitable arrangement. Further, one or more components may be rearranged, changed, added, and/or removed.

In operation, the user 124 may initiate the network session request between the client device 106 and the server 108. The network session may refer to a logical connection or interaction between the client device 106 and the server 108. The network session may be a fundamental concept in networking, particularly relating to protocols and applications that may require continuous or long-lasting interactions. During the network session, data may be exchanged in the form of packet data, and a series of requests and responses may be handled between the communicating entities. Therefore, the network session may be critical for maintaining context and state in networked applications, ensuring that data may be transmitted reliably and efficiently.

The packet data associated with the network session between the client device 106 and the server 108 may include a set of Internet Protocol (IP) packets and a timestamp associated with each IP packet of the set of IP packets. The set of IP packets may be a foundation of data transmission across the communication network 104 (that may include the internet). Each IP packet of the set of IP packets may include at least two components header data and payload data. The header data may include metadata that may include a source IP address, a destination IP address, a packet length, a time-to-live (TTL), and a checksum to verify data integrity. The payload data may include actual data, for example, but not limited to, web content, emails, and multimedia streams. The set of IP packets may play an important role in the functioning of the Internet Protocol, enabling the efficient routing of data across communication network 104.

Further, the timestamp associated with each IP packet of the set of IP packets may correspond to a record of information at which the IP packet may be received. Such information may include, but is not limited to, a time interval and date associated with the reception of the IP packet. For example, a first IP packet may be received at a first timestamp that may be "17.04799501" and a second IP packet may be received 1 second later at a second timestamp that may be "17.04799502". In an exemplary embodiment, the first IP packet and the second IP packet may be received at the same timestamp. In an example, the timestamp associated with each IP packet of the set of IP packets may be determined using the time of arrival in the Unix timestamp or Epoch timestamp.

Upon reception of the network session request by the user 124, the system 102 may be configured to retrieve the second packet data 118 associated with the network session between the client device 106 and the server 108. The second packet data 118 may include a second set of Internet Protocol (IP) packets 120 and a timestamp associated with each IP packet of the first set of IP packets 120. The second set of IP packets 120 may include but is not limited to a first IP packet 120a, a second IP packet 120b, and a third IP packet 120c. The second packet data 118 may further include but is not limited to a first timestamp 122a associated with the first IP packet 120a, a second timestamp 122b associated with the second IP packet 120b, and a third timestamp 122c associated with the third IP packet 120c.

In an embodiment, the second set of IP packets 120 may be associated with a Transmission Control Protocol (TCP)-based network connection between the client device 106 and the server 108. Further, the first IP packet 120a may be transmitted from the client device 106 to the server 108 to initiate the TCP-based network connection between the client device 106 and the server 108. Thereafter, the server 108 may receive the first IP packet 120a and generate a response to acknowledge the reception of the first IP packet 120a by the server 108. The response may be in the form of the second IP packet 120b transmitted from the server 108 to the client device 106. Further, the client device 106 may transmit the third IP packet 120c to the server 108 for an establishment of the TCP-based network connection between the client device 106 and the server 108. Details associated with the second set of IP packets 120 are provided, for example, in FIG. 3.

Upon establishment of the TCP-based network connection between the client device 106 and the server 108, the system 102 may be configured to retrieve the first packet data 112 associated with the network session between the client device 106 and the server 108. The first packet data 112 may include a first set of Internet Protocol (IP) packets 114 and a timestamp associated with each IP packet of the first set of IP packets 114. The first set of IP packets 114 may include, but is not limited to, a first IP packet 114a, a second IP packet 114b, a third IP packet 114c, a fourth IP packet 114d, and an Nth IP packet 110n. The first packet data 112 may further include but is not limited to a first timestamp 116a associated with the first IP packet 114a, a second timestamp 116b associated with the second IP packet 114b, a third timestamp 116c associated with the third IP packet 114c, a fourth timestamp 116d associated with the fourth IP packet 114d, and a Nth timestamp 116n associated with the Nth IP packet 114n.

In an embodiment, the first set of IP packets 114 may be associated with an encryption of the network session between the client device 106 and the server 108. Further, the first IP packet 114a may be transmitted from the client device 106 to the server 108 to initiate the encrypted connection between the client device 106 and the server 108. Thereafter, the server 108 may receive the first IP packet 114a and generate a response to acknowledge the reception of the first IP packet 114a by the server 108. The response may be in the form of the second IP packet 114b transmitted from the server 108 to the client device 106. Further, the server 108 may transmit the third IP packet 114c to the client device 106 for the establishment of the encrypted connection between the client device 106 and the server 108. Thereafter, the client device 106 may transmit the fourth IP packet 114d to the server 108 to access application data from the server 108. Details associated with the first set of IP packets 114 are provided, for example, in FIG. 3.

In an embodiment, the system 102 may be configured to calculate, based on the retrieved first packet data 112, a first latency between the first timestamp 116a associated with the first IP packet 114a and the second timestamp 116b associated with the second IP packet 114b. Further, the system 102 may be configured to calculate, based on the retrieved first packet data 112, a second latency between the first timestamp 116a associated with the first IP packet 114a and the third timestamp 116c associated with the third IP packet 114c. The system 102 may be further configured to calculate, based on the retrieved first packet data 112, a third latency between the third timestamp 116c associated with the third IP packet 114c and the fourth timestamp 116d associated with the fourth IP packet 114d. Details associated with the first latency, the second latency, and the third latency are provided, for example, in FIGS. 3, and 4.

In another embodiment, the system 102 may be configured to calculate, based on the retrieved second packet data 118, a fourth latency between the first timestamp 122a associated with the first IP packet 120a, and the second timestamp 122b associated with the second IP packet 120b. The system 102 may be further configured to calculate, based on the retrieved second packet data 118, a fifth latency between the first timestamp 122a associated with the first IP packet 120a, and the third timestamp 122c associated with the third IP packet 120c. Details associated with the fourth latency, and the fifth latency are provided, for example, in FIGS. 3, and 4.

In an embodiment, the system 102 may be configured to provide, as an input, the calculated first latency, the calculated second latency, the calculated third latency, the fourth latency, and the fifth latency to the ML model 110. Thereafter, the system 102 may be configured to generate an alert associated with the network session based on an output of the ML model 110 and render the generated alert. Details associated with the generation of the alert are provided, for example, in FIG. 4.

In general, a Virtual Private Network (VPN)-based network traffic may correspond to a Secure Socket Layer (SSL)/Transport Layer Security (TLS)-based VPN traffic. The SSL/TLS-based VPN traffic may be designed to establish secure connections for remote access and may employ encryption to ensure privacy and anonymity. However, such SSL/TLS-based VPN traffic often resembles normal encrypted network traffic, making it challenging for existing security visibility tools to accurately classify the SSL/TLS-based VPN traffic and the normal encrypted network traffic. Further, existing solutions may rely on the Indicator of Compromise (IOC) based approach that may be expensive to maintain and update. Additionally, such solutions may complicate the issue by utilizing numerous features, thereby leading to computational and excessive memory usage, making them impractical for Network Detection and Response (NDR) systems.

To overcome the problems associated with the existing solutions, the proposed system 102 may correspond to a reliable and light weight enhancement to the NDR systems, thereby optimizing the process by accurately distinguishing between the normal encrypted network traffic and the SSL/TLS-based VPN traffic. Further, the system 102 may leverage machine learning techniques for binary classification. The system 102 may employ latency-based features, in addition to the ML model 110 to efficiently classify the normal encrypted network traffic and the SSL/TLS-based VPN traffic. By focusing on streamlined feature engineering, the system 102 may eliminate the need for the IOC-based approach. Details associated with the latency-based features are provided, for example, in FIG. 3.

Further, the classification of the normal encrypted network traffic and the SSL/TLS-based VPN traffic may effectively mitigate emerging threats associated with deceptive websites, phishing campaigns, or social engineering attacks. Additionally, the classification of the SSL/TLS-based VPN traffic may support in identification of malware, ransomware, and intrusion attempts that may use VPN tunnels to infiltrate or move laterally within the network traffic. Moreover, the system 102 may be configured to monitor a usage of the VPN, thereby preventing an accidental or intentional leak of sensitive data. For example, an employee of an organization might use the VPN to bypass security measures, thereby leading to a leak of sensitive data. In such an example, the system 102 may classify the SSL/TLS-based VPN traffic and control such usage of the VPN.

The functions or operations executed by the system 102, as described in FIG. 1, may be performed by the processor 202. Operations executed by the processor 202 are described in detail, for example, in FIG. 3, FIG. 4, and FIG. 5.

FIG. 2 illustrates a block diagram of the system of FIG. 1, in accordance with an embodiment of the disclosure. FIG. 2 is explained in conjunction with elements from FIG. 1. In FIG. 2, there is shown the block diagram 200 of the system 102. The system 102 may include at least one processor 202 (referred to as a processor 202, hereinafter), at least one non-transitory memory 204 (referred to as a memory 204, hereinafter), an input/output (I/O) interface 206, and a communication interface 208. The processor 202 may be connected to the memory 204, the I/O interface 206, and the communication interface 208 through one or more wired or wireless connections. Although in FIG. 2, it is shown that the system 102 includes the processor 202, the memory 204, the I/O interface 206, and the communication interface 208 however, the disclosure may not be so limiting and the system 102 may include fewer or more components to perform the same or other functions of the system 102.

The processor 202 of the system 102 may be configured to classify normal encryption-based network traffic and SSL/TLS-based VPN traffic. The processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application-specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining, and/or multithreading. Additionally, or alternatively, the processor 202 may include one or more processors capable of processing large volumes of workloads and operations to provide support for big data analysis. In an example embodiment, the processor 202 may be in communication with the memory 204 via a bus for passing information among components of the system 102.

For example, when the processor 202 may be embodied as an executor of software instructions, the instructions may specifically configure the processor 202 to perform the algorithms and/or operations described herein when the instructions are executed. However, in some cases, the processor 202 may be a processor-specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU), and logic gates configured to support the operation of the processor 202. The communication network 104 may be accessed using the communication interface 208 of the system 102. The communication interface 208 may provide an interface for accessing various features and data stored in the system 102.

The memory 204 may be non-transitory and may include, for example, one or more volatile and/or non-volatile memories. In other words, for example, the memory 204 may be an electronic storage device (for example, a computer-readable storage medium) comprising gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplified in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an Application Specific Integrated Circuit (ASIC), Field Programmable Gate Array (FPGA), or the like, the processor 202 may be specifically configured hardware for conducting the operations described herein. In an embodiment, memory may be configured to store the first packet data 112, the second packet data 118, and the ML model 110.

In an embodiment, the processor 202 may be configured to train the ML model 110 based on the calculated first latency, the calculated second latency, the calculated third latency, the fourth latency, the fifth latency, and the generated alert, and store the trained ML model 110 in the memory 204. In an embodiment, the ML model 110 may correspond to an Extreme Gradient Boosting (XGBoost) based classifier. In another embodiment, the ML model 110 may correspond to an Artificial Neural Network (ANN) based classifier. In an exemplary embodiment, the ML model 110 may be used for various tasks such as, but not limited to, classification, regression, pattern recognition, and decision-making.

In some example embodiments, the I/O interface 206 may communicate with the system 102 and display the input and/or output of the system 102. As such, the I/O interface 206 may include a display and, in some embodiments, may also include a keyboard, a mouse, a touch screen, touch areas, soft keys, or other input/output mechanisms. In one embodiment, the system 102 may include a user interface circuitry configured to control at least some functions of one or more I/O interface elements such as a display and, in some embodiments, a plurality of speakers, a ringer, one or more microphones and/or the like. The processor 202 and/or I/O interface 206 circuitry including the processor 202 may be configured to control one or more functions of one or more I/O interface 206 elements through computer program instructions (for example, software and/or firmware) stored on a memory 204 accessible to the processor 202.

The communication interface 208 may include the input interface and output interface for supporting communications to and from the system 102 or any other component with which the system 102 may communicate. The communication interface 208 may be any means such as a device or circuitry embodied in either hardware or a combination of hardware and software that is configured to receive and/or transmit data to/from a communications device in communication with the system 102. In this regard, the communication interface 208 may include, for example, an antenna (or multiple antennae) and supporting hardware and/or software for enabling communications with a wireless communication network. Additionally, or alternatively, the communication interface 208 may include the circuitry for interacting with the antenna(s) to cause transmission of signals via the antenna(s) or to handle receipt of signals received via the antenna(s). In some environments, the communication interface 208 may alternatively or additionally support wired communication. As such, for example, the communication interface 208 may include a communication modem and/or other hardware and/or software for supporting communication via cable, digital subscriber line (DSL), universal serial bus (USB), or other mechanisms.

FIG. 3 is a diagram that illustrates exemplary packet data associated with the network session, in accordance with an embodiment of the disclosure. FIG. 3 is explained in conjunction with elements from FIG. 1 and FIG. 2. In FIG. 3, there is shown a table 300 of the exemplary packet data associated with the network session between the client device 106 and the server 108. The table 300 further includes a set of columns, for example, but not limited to, a timestamp, a source, a destination, a protocol, a length, and info.

In an embodiment, a value associated with the column "timestamp" may correspond to the timestamp at which the IP packet may be received. Further, data associated with the column "source" may correspond to a source IP address associated with a source of the IP packet, for example, from where the IP packet may be transmitted. Further, data associated with the column "destination" may correspond to a destination IP address associated with a destination of the IP packet, for example, from whom the IP packet may be received. For example, the source of the IP packet or the destination of the IP packet may correspond to at least one of the client device 106, or the server 108.

Further, information associated with the column "protocol" may correspond to a type of network connection established between the source and the destination. For example, the protocol may correspond to, but is not limited to, the TCP-based network connection, or Secure Socket Layer (SSL)/Transport Layer Security (TLS)-based network connection. Data associated with the column "length" may correspond to information associated with a packet length of the received IP packet. Further, data associated with the column "info" may correspond to information associated with the IP packet that may be received at the corresponding timestamp.

In an embodiment, the user 124 may initiate a request to establish a Transmission Control Protocol (TCP)-based network connection between the client device 106 and the server 108. Upon reception of the request by the user 124, the system 102 may be configured to retrieve the second packet data 118 associated with the network session between the client device 106 and the server 108. The second packet data 118 may include the second set of IP packets 120 and a timestamp associated with each IP packet of the first set of IP packets 120.

By way of an example, the user 124 may initiate a request to establish the TCP-based network connection with a website for example, "www.abcxyz.com". In such an example, when the TCP-based network connection may be established a 3-way handshake may be made. Initially, the first IP packet 120a may be transmitted from the client device 106 (the source) to the server 108 (the destination) to initiate the TCP-based network connection. The first IP packet 120a may correspond to an initial request packet, for example, a SYN (synchronize) packet. In response to the SYN packet, the server 108 may transmit the second IP packet 120b to the client device 106, thereby acknowledging the reception of the first IP packet 120a by the server 108. The second IP packet 120b may correspond to a SYN-ACK (synchronize-acknowledgement) packet. Thereafter, the client device 106 may transmit the third IP packet 120c to the server 108 to confirm the establishment of the TCP-based network connection. The third IP packet 120c may correspond to an ACK (acknowledgement) packet.

As shown in FIG. 3, an IP address associated with the client device 106 may be "192.168.2.2 . . . ", and an IP address associated with the server 108 may be "52.139.176.1". Further, the SYN packet may be transmitted from the client device 106 to the server 108 at the first timestamp 122a which may be "13.5767", SYN-ACK packet may be transmitted from the server 108 to the client device 106 at the second timestamp 122b that may be "13.6992", and the ACK packet transmitted from the client device 106 to the server 108 at the third timestamp 122c that may be "13.6998".

In an embodiment, the system 102 may be configured to calculate, based on the retrieved second packet data 118, a fourth latency 302 between the first timestamp 122a associated with the first IP packet 120a, and the second timestamp 122b associated with the second IP packet 120b. The fourth latency 302 may correspond to a TCP server latency. The TCP server latency may further correspond to a time interval between the SYN packet and the SYN-ACK packet. Further, the TCP server latency may refer to a time delay experienced by the server 108 while processing and responding to the request from the client device 106 over the TCP-network connection. As shown in FIG. 3, the fourth latency 302 may be "0.1232", corresponding to a difference between the first timestamp 122a (13.5767), and the second timestamp 122b (13.6992).

The system 102 may be further configured to calculate, based on the retrieved second packet data 118, a fifth latency 304 between the first timestamp 122a associated with the first IP packet 120a, and the third timestamp 122c associated with the third IP packet 120c. The fifth latency 304 may correspond to a TCP connection latency. The TCP connection latency may further correspond to a time interval between the SYN packet and the ACK packet. Further, the TCP connection latency may refer to a time delay experienced during the establishment of the TCP-based network connection, for example, a time interval to complete the 3-way TCP handshake between the client device 106 and the server 108. As shown in FIG. 3, the fifth latency 304 may be "0.1238", corresponding to a difference between the first timestamp 122a (13.5767), and the third timestamp 122c (13.6998).

Upon establishment of the TCP-based network connection between the client device 106 and the server 108, the system 102 may be configured to retrieve the first packet data 112 associated with the network session between the client device 106 and the server 108. The first packet data 112 may include a first set of Internet Protocol (IP) packets 114 and a timestamp associated with each IP packet of the first set of IP packets 114.

By way of an example, the first IP packet 114a may be transmitted from the client device 106 to the server 108 to initiate the encrypted network connection with the server 108. The first IP packet 114a may correspond to a Client Hello packet. For example, the client device 106 may initiate a handshake by transmitting a "hello" message to the server 108. The client "hello" message may include a TLS version that the client device 106 may support, supported cipher suite, and a string of random bytes known as the "client random".

In response to the Client Hello packet, the server 108 may transmit the second IP packet 114b to the client device 106, thereby acknowledging the reception of the first IP packet 114a by the server 108. The second IP packet 114b may correspond to a Server Hello packet. In an example, the server 108 may transmit a message containing the server's SSL certificate, the server's chosen cipher suite, and the "server random," another random string of bytes that are generated by the server, in response to the client "hello" message.

Thereafter, the client device 106 may transmit the third IP packet 114c to the server 108 to confirm the establishment of the encrypted connection. The third IP packet 120c may correspond to an encrypted handshake packet from the server 108. The encrypted handshake packet from the server 108 may correspond to a communication between the server 108 and the client device 106 to establish a secure (encrypted) connection. To establish the encrypted connection various cryptographic techniques may be employed. For example, the server 108 may present the SSL certificate to the client device 106 which may include a public key. The client device 106 may verify the authenticity of the certificate and use the public key associated with the server 108 to encrypt a randomly generated session key. This session key may be sent back to the server 108 encrypted, thereby ensuring that only server 108 with the corresponding private key may decrypt it.

Further, the client device 106 may transmit the fourth IP packet 114d to the server 108 to access application data from the server 108. The fourth IP packet 114d may correspond to the application data packet. In an example, the application data packet may correspond to data generated by an application running on the client device 106 and intended for transmission over the network to the server 108 or another client device. Such application data packets may include payload data generated by the application, for example, user inputs, requests, commands, and the like.

As shown in the FIG. 3, the Client Hello packet may be transmitted from the client device 106 to the server 108 at the first timestamp 116*a* which may be "13.6714", Server Hello packet may be transmitted from the server 108 to the client device 106 at the second timestamp 116*b* that may be "14.0435", the encrypted handshake packet transmitted from the client device 106 to the server 108 at the third timestamp 116*c* that may be "14.0450", and the application data packet transmitted from the client device 106 to the server 108 at the fourth timestamp 116*d* that may be "14.0453".

In an embodiment, the system 102 may be configured to calculate, based on the retrieved first packet data 112, a first latency 306 between the first timestamp 116*a* associated with the first IP packet 114*a* and the second timestamp 116*b* associated with the second IP packet 114*b*. The first latency 306 may correspond to a client hello server hello latency. The client hello-server hello latency may further correspond to a time interval between the client hello packet and the server hello packet. The client hello-server hello latency may correspond to a time delay experienced by the server 108 while processing and responding to the request from the client device 106 for establishing a secure encrypted connection in the TLS protocol. As shown in FIG. 3, the first latency 306 may be "0.3721", corresponding to a difference between the first timestamp 116*a* (13.6714), and the second timestamp 116*b* (14.0435).

Further, the system 102 may be configured to calculate, based on the retrieved first packet data 112, a second latency 308 between the first timestamp 116*a* associated with the first IP packet 114*a* and the third timestamp 116*c* associated with the third IP packet 114*c*. The second latency 308 may correspond to a handshake latency. The handshake latency may further correspond to a time interval between the client hello packet and the encrypted handshake packet. The handshake latency may correspond to a time delay experienced during the establishment of the encrypted network connection, for example, a time interval to complete the TLS handshake between the client device 106 and the server 108. As shown in FIG. 3, the second latency 308 may be "0.3736", corresponding to a difference between the first timestamp 116*a* (13.6714), and the third timestamp 116*c* (14.0450).

The system 102 may be further configured to calculate, based on the retrieved first packet data 112, a third latency 310 between the third timestamp 116*c* associated with the third IP packet 114*c* and the fourth timestamp 116*d* associated with the fourth IP packet 114*d*. The third latency 310 may correspond to an application start latency. The application start latency may further correspond to a time interval between the encrypted handshake and the application data packet. In an example, the application start latency may further correspond to a time interval between the last encrypted handshake and the first application data packet. Further, the application start latency may correspond to a time delay between the launch of a software application and its complete readiness for user interaction or operation. As shown in FIG. 3, the third latency 310 may be "0.0003", corresponding to a difference between the third timestamp 116*c* (14.0450), and the fourth timestamp 116*d* (14.0453).

FIG. 4 is a diagram that illustrates exemplary operations for classifying the network sessions, in accordance with an embodiment of the disclosure. FIG. 4 is explained in conjunction with elements from FIG. 1, FIG. 2, and FIG. 3. In FIG. 4, there is shown the block diagram 400 of the exemplary operations of the system 102. The operations may be executed by any computing system, for example, by the system 102 of FIG. 1 or the processor 202 of FIG. 2

At 402, the first data packet may be retrieved. In an embodiment, the processor 202 may be configured to retrieve the first packet data 112 associated with the network session between the client device 106 and the server 108. The first packet data 112 includes the first set of Internet Protocol (IP) packets 114 and the timestamp associated with each IP packet of the first set of IP packets 114. Details associated with the first packet data 112 are provided, for example, in FIGS. 1, and 3.

At 404, a first latency may be calculated. In an embodiment, the processor 202 may be configured to calculate, based on the retrieved first packet data 112, the first latency 306 between the first timestamp 116*a* associated with the first IP packet 114*a* transmitted from the client device 106 to the server 108 to initiate an encrypted connection with the server 108 and the second timestamp 116*b* associated with the second IP packet 114*b* transmitted from the server 108 to the client device 106 to acknowledge reception of the first IP packet 114*a* by the server 108. The first set of IP packets 114 includes the first IP packet 114*a* and the second IP packet 114*b*. Details associated with the calculation of the first latency 306 are provided, for example, in FIG. 3.

At 406, a second latency may be calculated. In an embodiment, the processor 202 may be configured to calculate, based on the retrieved first packet data 112, the second latency 308 between the first timestamp 116*a* associated with the first IP packet 114*a* and the third timestamp 116*c* associated with the third IP packet 114*c* transmitted from the client device 106 to the server 108 for an establishment of the encrypted connection between the client device 106 and the server 108. The first set of IP packets 114 includes the third IP packet 114*c*. Details associated with the calculation of the second latency 308 are provided, for example, in FIG. 3.

At 408, a third latency may be calculated. In an embodiment, the processor 202 may be configured to calculate, based on the retrieved first packet data 112, the third latency 310 between the third timestamp 116*c* associated with the third IP packet 114*c* and the fourth timestamp 116*d* associated with the fourth IP packet 114*d* transmitted from the client device 106 to the server 108 to access application data from the server 108. The first set of IP packets 114 includes the fourth IP packet 114*d*. Details associated with the calculation of the third latency 310 are provided, for example, in FIG. 3.

At 410, the second packet data may be retrieved. In an embodiment, the processor 202 may be configured to retrieve the second packet data 118 associated with the network session between the client device 106 and the server 108. The second packet data 118 includes the second set of Internet Protocol (IP) packets 120 and a timestamp associated with each IP packet of the second set of IP packets 120. Details associated with the second packet data 118 are provided, for example, in FIGS. 1, and 3.

At 412, a fourth latency may be calculated. In an embodiment, the processor 202 may be configured to calculate, based on the retrieved second packet data 118, the fourth latency 302 between the first timestamp 122*a* associated with the first IP packet 120*a* transmitted from the client device 106 to the server 108 to initiate a Transmission Control Protocol (TCP)-based network connection between the client device 106 and the server 108 and the second timestamp 122*b* associated with the second IP packet 120*b* transmitted from the server 108 to the client device 106 to acknowledge reception of the first IP packet 120*a* by the server 108. The second set of IP packets 120 includes the first IP packet 120*a* and the second IP packet 120*b*. Details associated with the calculation of the fourth latency 302 are provided, for example, in FIG. 3.

At 414, a fifth latency may be calculated. In an embodiment, the processor 202 may be configured to calculate, based on the retrieved second packet data 118, the fifth latency 304 between the first timestamp 122*a* associated with the first IP packet 120*a* and the third timestamp 122*c* associated with the third IP packet 120*c* transmitted from the client device 106 to the server 108 for an establishment of the TCP-based network connection between the client device 106 and the server 108. The second set of IP packets 120 includes the third IP packet 120*c*. Details associated with the calculation of the fifth latency 304 are provided, for example, in FIG. 3.

At 416, an output of the ML model 110 may be generated. In an embodiment, the processor 202 may be configured to provide, as the input, the calculated first latency 306, the calculated second latency 308, the calculated third latency 310, the calculated fourth latency 302, and the calculated fifth latency 304 to the ML model 110 to generate the output of the ML model 110. In an embodiment, the ML model 110 may correspond to an Artificial Neural Network (ANN) based classifier.

In another embodiment, the ML model 110 may correspond to an Extreme Gradient Boosting (XGBoost)-based classifier. The XGBoost-based classifier may correspond to a machine learning algorithm that may facilitate classification and/or regression operations. The XGBoost may operate within a boosting ensemble framework, where one or more weak learners (such as decision trees) may be sequentially combined to form a strong learner. Further, the XGBoost may adopt a gradient-boosting approach, which involves constructing decision trees to correct errors or the preceding decision trees, iteratively. Further, it aims at the optimization of an objective function including a loss function for quantifying predicting errors and a regularization term to prevent overfitting. Through gradient descent optimization, the XGBoost minimizes this objective function by updating model parameters. Further, decision trees may be built sequentially, focusing on residuals, with an algorithm identifying optimal splits to minimize loss. The XGBoost may leverage regularization techniques like pruning and shrinkage to enhance model robustness. Further, efficiency and scalability may be achieved by parallel and distributed computing. In prediction, the XGBoost aggregates individual decision tree predictions by employing a SoftMax function for classification tasks. This comprehensive approach may deliver high predictive accuracy, scalability, and speed.

At 418, the network session may be classified. In an embodiment, the processor 202 may be configured to classify the network session between the client device 106 and the server 108 as the encrypted network session (or normal encrypted network traffic) based on the output of the ML model 110. In another embodiment, the processor 202 may be configured to classify the network session between the client device 106 and the server 108 as the virtual private network (VPN)-based encrypted network session (or TLS-based VPN traffic) based on the output of the ML model 110.

In an embodiment, the ML model 110 may be pre-trained to classify the network session between the client device 106 and the server 108 as one of the encrypted network session or the virtual private network (VPN)-based encrypted network session based on the retrieved first packet data 112 associated with the network session. In an example, values associated with the calculated latency features (such as the calculated first latency 306, the calculated second latency 308, the calculated third latency 310, the fourth latency 302, and the fifth latency 304) for the encrypted network session (or normal encrypted network traffic) may have larger variation then values associated with the calculated latency features for the VPN-based encrypted network session (or TLS-based VPN traffic).

In another example, the processor 202 may be configured to calculate a set of parameters associated with each latency feature of the calculated latency features. The set of parameters associated with a latency feature may include for example, but not limited to a minimum value associated with the latency feature, a maximum value associated with the latency feature, and a mean value associated with the latency feature. Further, the ML model 110 may be configured to classify the network session between the client device 106 and the server 108 based on the set of parameters associated with each latency feature of the calculated latency features. In an example, the minimum value and the maximum value associated with each latency feature of the calculated latency features associated with the encrypted network session (or normal encrypted network traffic) may be widely separated as compared to a minimum value and a maximum value associated with corresponding latency feature associated with VPN-based encrypted network session (or TLS-based VPN traffic). Further, a standard deviation from the mean value associated with each latency feature of the calculated latency features associated with the encrypted network session (or normal encrypted network traffic) may have a larger value than a standard deviation from a mean value associated with corresponding latency feature associated with the VPN-based encrypted network session (or TLS-based VPN traffic).

In an embodiment, the ML model 110 may assign a weightage score associated with each latency feature of the calculated latency features to classify the network session between the client device 106 and the server 108 as one of the encrypted network session (or normal encrypted network traffic) or the virtual private network (VPN)-based encrypted network session (or TLS-based VPN traffic) based on the retrieved first packet data 112 associated with the network session. The weightage score may be indicative of a contribution of each latency feature of the calculated latency features to classify the network session between the client device 106 and the server 108. In an example, each latency feature (such as the calculated first latency 306, the calculated second latency 308, the calculated third latency 310, the fourth latency 302, and the fifth latency 304) may have an equal weightage score. In another example, each latency feature may have a different weightage score. In an embodiment, the processor 202 may be configured to update the weightage score associated with each latency feature of the calculated latency features. Further, the ML model 110 may be trained on the updated weightage score to classify the network session between the client device 106 and the server 108 as one of the encrypted network session (or normal encrypted network traffic) or the virtual private network (VPN)-based encrypted network session (or TLS-based VPN traffic) based on the retrieved first packet data 112 associated with the network session.

At 420, an alert may be generated. In an embodiment, the processor 202 may be further configured to generate the alert associated with the network session based on the output of the ML model 110. For example, the generated alert may correspond to a warning message for the user 124 (such as the network administrator) based on the classification of the network session between the client device 106 and the server 108 as the virtual private network (VPN)-based encrypted network session (or TLS-based VPN traffic) based on the output of the ML model 110. In another example, the generated alert may correspond to a notification message for the user 124 based on the classification of the network session between the client device 106 and the server 108 as the encrypted network session based on the output of the ML model 110.

At 422, the alert may be rendered. In an embodiment, the processor 202 may be configured to render the generated alert. In an example, the alert may be displayed on the client device 106 associated with the user for example, nut not limited to a notification message, a warning message, or an alarm.

In an embodiment, the ML model 110 may be trained based on the calculated first latency 306, the calculated second latency 308, the calculated third latency 310, the fourth latency 302, the fifth latency 304, and the generated alert. In an embodiment, the processor 202 may be configured to train the ML model 110. Further, the processor 202 may be configured to store the trained ML model 110.

FIG. 5 is a flowchart that illustrates an exemplary method for classifying the network sessions, in accordance with an embodiment of the disclosure. FIG. 5 is explained in conjunction with elements from FIGS. 1, 2, 3, and 4. With reference to FIG. 5, there is shown the flowchart 500. The operations of the exemplary method may be executed by any computing system, for example, by the system 102 of FIG. 1 or the processor 202 of FIG. 2. The operations of the flowchart 500 may start at 502.

At 502, first data packet may be retrieved. In an embodiment, the processor 202 may be configured to retrieve the first packet data 112 associated with a network session between the client device 106 and the server 108. The first packet data 112 includes the first set of Internet Protocol (IP) packets 114 and a timestamp associated with each IP packet of the first set of IP packets 114.

At 504, a first latency may be calculated. In an embodiment, the processor 202 may be configured to calculate, based on the retrieved first packet data 112, the first latency 306 between the first timestamp 116a associated with the first IP packet 114a transmitted from the client device 106 to the server 108 to initiate an encrypted connection with the server 108 and the second timestamp 116b associated with the second IP packet 114b transmitted from the server 108 to the client device 106 to acknowledge reception of the first IP packet 114a by the server 108. The first set of IP packets 114 includes the first IP packet 114a and the second IP packet 114b.

At 506, a second latency may be calculated. In an embodiment, the processor 202 may be configured to calculate, based on the retrieved first packet data 112, the second latency 308 between the first timestamp 116a associated with the first IP packet 114a and the third timestamp 116c associated with the third IP packet 114c transmitted from the client device 106 to the server 108 for an establishment of the encrypted connection between the client device 106 and the server 108. The first set of IP packets 114 includes the third IP packet 114c.

At 508, a third latency may be calculated. In an embodiment, the processor 202 may be configured to calculate, based on the retrieved first packet data 112, the third latency 310 between the third timestamp 116c associated with the third IP packet 114c and the fourth timestamp 116d associated with the fourth IP packet 114d transmitted from the client device 106 to the server 108 to access application data from the server 108. The first set of IP packets 114 includes the fourth IP packet 114d.

At 510, an input may be provided to a machine learning (ML) model. In an embodiment, the processor 202 may be further configured to provide, as the input, the calculated first latency 306, the calculated second latency 308, and the calculated third latency 310 to the ML model 110.

At 512, an alert may be generated. In an embodiment, the processor 202 may be further configured to generate the alert associated with the network session based on the output of the ML model 110.

At 514, the alert may be rendered. In an embodiment, the processor 202 may be configured to render the generated alert.

Alternatively, the system 102 may comprise means for performing each of the operations described above. In this regard, according to an example embodiment, examples of means for performing operations may comprise, for example, the processor and/or a device or circuit for executing instructions or executing an algorithm for processing information as described above.

Various embodiments of the disclosure may provide a non-transitory computer-readable medium and/or storage medium having stored thereon, instructions executable by a machine and/or a computer to operate a system (e.g., the system 102) classifying the network sessions. The instructions may cause the machine and/or computer to perform operations including retrieving the first packet data 112 associated with a network session between the client device 106 and the server 108. The first packet data 112 includes the first set of Internet Protocol (IP) packets 114 and a timestamp associated with each IP packet of the first set of IP packets 114. The operations may further include calculating, based on the retrieved first packet data 112, the first latency 306 between the first timestamp 116a associated with the first IP packet 114a transmitted from the client device 106 to the server 108 to initiate an encrypted connection with the server 108 and the second timestamp 116b associated with the second IP packet 114b transmitted from the server 108 to the client device 106 to acknowledge reception of the first IP packet 114a by the server 108. The first set of IP packets 114 includes the first IP packet 114a and the second IP packet 114b. The operations may further include calculating, based on the retrieved first packet data 112, the second latency 308 between the first timestamp 116a associated with the first IP packet 114a and the third timestamp 116c associated with the third IP packet 114c transmitted from the client device 106 to the server 108 for an establishment of the encrypted connection between the client device 106 and the server 108. The first set of IP packets 114 includes the third IP packet 114c. The operations may further include calculating, based on the retrieved first packet data 112, the third latency 310 between the third timestamp 116c associated with the third IP packet 114c and the fourth timestamp 116d associated with the fourth IP packet 114d transmitted from the client device 106 to the server 108 to access application data from the server 108. The first set of IP packets 114 includes the fourth IP packet 114d. The operations may further include providing, as the input, the calculated first latency 306, the calculated second latency 308, and the calculated third latency 310 to the ML model 110. The operation may further include generating the alert associated with the network session based on the output of the ML model 110 and rendering the generated alert.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of reactants and/or functions, it should be appreciated that different combinations of reactants and/or functions may be provided by alternative embodiments without departing from the scope of the appended claims. In this regard, for example, different combinations of reactants and/or functions than those explicitly described above are also contemplated as may be set forth in some of the appended claims. Although specific terms are employed herein, they are used in a generic and descriptive sense only and not for purposes of limitation.

What is claimed:

1. A system, comprising:

processor configured to:

retrieve first packet data associated with a network session between a client device and a server, wherein the first packet data comprises a first set of Internet Protocol (IP) packets and a timestamp associated with each IP packet of the first set of IP packets;

calculate, based on the retrieved first packet data, a first latency between a first timestamp associated with a first IP packet transmitted from the client device to the server to initiate an encrypted connection with the server and a second timestamp associated with a second IP packet transmitted from the server to the client device to acknowledge reception of the first IP packet by the server, wherein the first set of IP packets comprises of the first IP packet and the second IP packet;

calculate, based on the retrieved first packet data, a second latency between the first timestamp associated with the first IP packet and a third timestamp associated with a third IP packet transmitted from the client device to the server for an establishment of the encrypted connection between the client device and the server, wherein the first set of IP packets comprises of the third IP packet;

calculate, based on the retrieved first packet data, a third latency between the third timestamp associated with the third IP packet and a fourth timestamp associated with a fourth IP packet transmitted from the client device to the server to access application data from the server, wherein the first set of IP packets comprises of the fourth IP packet;

provide, as an input, the calculated first latency, the calculated second latency, and the calculated third latency to a machine learning (ML) model;

generate an alert associated with the network session based on an output of the ML model; and render the generated alert.

2. The system of claim 1, wherein the processor is further configured to:

retrieve second packet data associated with the network session between the client device and the server, wherein the second packet data comprises of a second set of Internet Protocol (IP) packets and a timestamp associated with each IP packet of the second set of IP packets;

calculate, based on the retrieved second packet data, a fourth latency between a first timestamp associated with a first IP packet transmitted from the client device to the server to initiate a Transmission Control Protocol (TCP)-based network connection between the client device and the server and a second timestamp associated with a second IP packet transmitted from the server to the client device to acknowledge reception of the first IP packet by the server, wherein the second set of IP packets comprises of the first IP packet, and the second IP packet;

provide, as the input, the calculated fourth latency to the ML model; and generate the alert associated with the network session based on the output of the ML model.

3. The system of claim 2, wherein the processor is further configured to:

calculate, based on the retrieved second packet data, a fifth latency between the first timestamp associated with the first IP packet and a third timestamp associated with a third IP packet transmitted from the client device to the server for an establishment of a TCP-based network connection between the client device and the server, wherein the second set of IP packets comprises of the third IP packet;

provide, as the input, the calculated fifth latency, to the ML model; and generate the alert associated with the network session based on the output of the ML model.

4. The system of claim 2, wherein the second set of Internet Protocol (IP) packets are associated with an establishment of the TCP-based network connection between the client device and the server.

5. The system of claim 1, wherein the first set of Internet Protocol (IP) packets are associated with an encryption of the network session between the client device and the server.

6. The system of claim 1, wherein the processor is further configured to:

classify the network session between the client device and the server as one of: an encrypted network session or a virtual private network (VPN)-based encrypted network session based on the output of the ML model; and generate the alert based on the classification of the network session.

7. The system of claim 1, wherein the ML model is pre-trained to classify the network session between the client device and the server as one of: an encrypted network session or a virtual private network (VPN)-based encrypted network session based on the retrieved first packet data associated with the network session.

8. The system of claim 1, wherein the processor is further configured to:

train the ML model based on the calculated first latency, the calculated second latency, the calculated third latency, a fourth latency, a fifth latency, and the generated alert; and store the trained ML model.

9. The system of claim 1, wherein the ML model corresponds to an Extreme Gradient Boosting (XGBoost) based classifier.

10. The system of claim 1, wherein the ML model corresponds to an Artificial Neural Network (ANN) based classifier.

11. A method, comprising:

retrieving first packet data associated with a network session between a client device and a server, wherein the first packet data comprises a first set of Internet Protocol (IP) packets and a timestamp associated with each IP packet of the first set of IP packets;

calculating, based on the retrieved first packet data, a first latency between a first timestamp associated with a first IP packet transmitted from the client device to the server to initiate an encrypted connection with the server and a second timestamp associated with a second IP packet transmitted from the server to the client device to acknowledge reception of the first IP packet by the server, wherein the first set of IP packets comprises of the first IP packet and the second IP packet;

calculating, based on the retrieved first packet data, a second latency between the first timestamp associated with the first IP packet and a third timestamp associated with a third IP packet transmitted from the client device to the server for an establishment of the encrypted connection between the client device with the server, wherein the first set of IP packets comprises of the third IP packet;

calculating, based on the retrieved first packet data, a third latency between the third timestamp associated with the third IP packet and a fourth timestamp associated with a fourth IP packet transmitted from the client device to the server to access application data from the server, wherein the first set of IP packets comprises of the fourth IP packet;

providing, as an input, the calculated first latency, the calculated second latency, and the calculated third latency to a machine learning (ML) model;

generating an alert associated with the network session based on an output of the ML model; and rendering the generated alert.

12. The method of claim 11, further comprising:

retrieving second packet data associated with the network session between the client device and the server, wherein the second packet data comprises of a second set of Internet Protocol (IP) packets and a timestamp associated with each IP packet of the second set of IP packets;

calculating, based on the retrieved second packet data, a fourth latency between a first timestamp associated with a first IP packet transmitted from the client device to the server to initiate a Transmission Control Protocol (TCP)-based network connection between the client device and the server and a second timestamp associated with a second IP packet transmitted from the server to the client device to acknowledge reception of the first IP packet by the server, wherein the second set of IP packets comprises of the first IP packet, and the second IP packet;

providing, as the input, the calculated fourth latency to the ML model; and generating the alert associated with the network session based on the output of the ML model.

13. The method of claim 12, further comprising:

calculating, based on the retrieved second packet data, a fifth latency between the first timestamp associated with the first IP packet and a third timestamp associated with a third IP packet transmitted from the client device to the server for an establishment of a TCP-based network connection of the client device with the server, wherein the second set of IP packets comprises of the third IP packet;

providing, as the input, the calculated fifth latency, to the ML model; and generating the alert associated with the network session based on the output of the ML model.

14. The method of claim 12, wherein the second set of Internet Protocol (IP) packets are associated with an establishment of the TCP-based network connection between the client device and the server.

15. The method of claim 11, wherein the first set of Internet Protocol (IP) packets are associated with an encryption of the network session between the client device and the server.

16. The method of claim 11, further comprising:

classifying the network session between the client device and the server as one of: an encrypted network session or a virtual private network (VPN)-based encrypted network session based on the output of the ML model; and generating the alert based on the classification of the network session.

17. The method of claim 11, wherein the ML model is pre-trained to classify the network session between the client device and the server as one of: an encrypted network session or a virtual private network (VPN)-based encrypted network session based on the retrieved first packet data associated with the network session.

18. The method of claim 11, further comprising:

training the ML model based on the calculated first latency, the calculated second latency, the calculated third latency, a fourth latency, a fifth latency, and the generated alert; and storing the trained ML model.

19. The method of claim 11, wherein the ML model corresponds to one of: an Extreme Gradient Boosting (XG-Boost) based classifier, or an Artificial Neural Network (ANN) based classifier.

20. A non-transitory computer-readable medium having stored thereon, computer-executable instructions that when executed by a processor of a system, causes the processor to execute operations, the operations comprising:

retrieving first packet data associated with a network session between a client device and a server, wherein the first packet data comprises a first set of Internet Protocol (IP) packets and a timestamp associated with each IP packet of the first set of IP packets;

calculating, based on the retrieved first packet data, a first latency between a first timestamp associated with a first IP packet transmitted from the client device to the server to initiate an encrypted connection with the server and a second timestamp associated with a second IP packet transmitted from the server to the client device to acknowledge reception of the first IP packet by the server, wherein the first set of IP packets comprises of the first IP packet and the second IP packet;

calculating, based on the retrieved first packet data, a second latency between the first timestamp associated with the first IP packet and a third timestamp associated with a third IP packet transmitted from the client device to the server for an establishment of the encrypted connection between the client device with the server, wherein the first set of IP packets comprises of the third IP packet;

calculating, based on the retrieved first packet data, a third latency between the third timestamp associated with the third IP packet and a fourth timestamp associated with a fourth IP packet transmitted from the client device to the server to access application data from the server, wherein the first set of IP packets comprises of the fourth IP packet;

providing, as an input, the calculated first latency, the calculated second latency, and the calculated third latency to a machine learning (ML) model;
generating an alert associated with the network session based on an output of the ML model; and
rendering the generated alert.

* * * * *